J. P. PROBST.
PROCESS OF FILTERING.
APPLICATION FILED JUNE 12, 1919.
1,378,274.
Patented May 17, 1921.
2 SHEETS—SHEET 1.
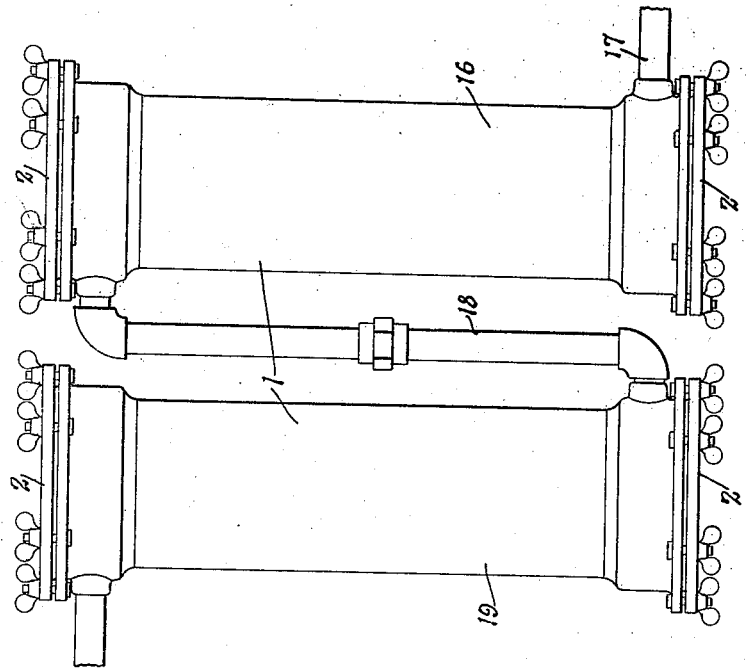
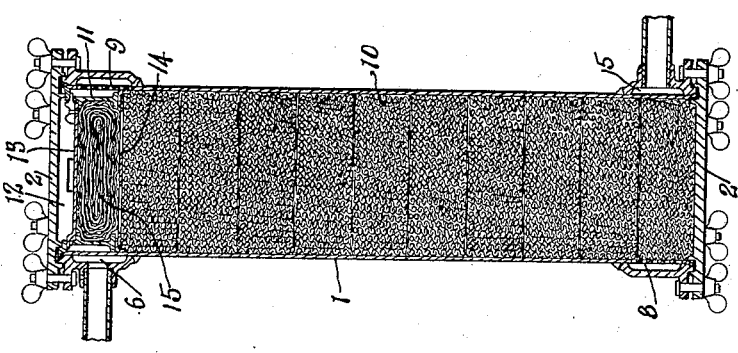
Inventor
John P. Probst,

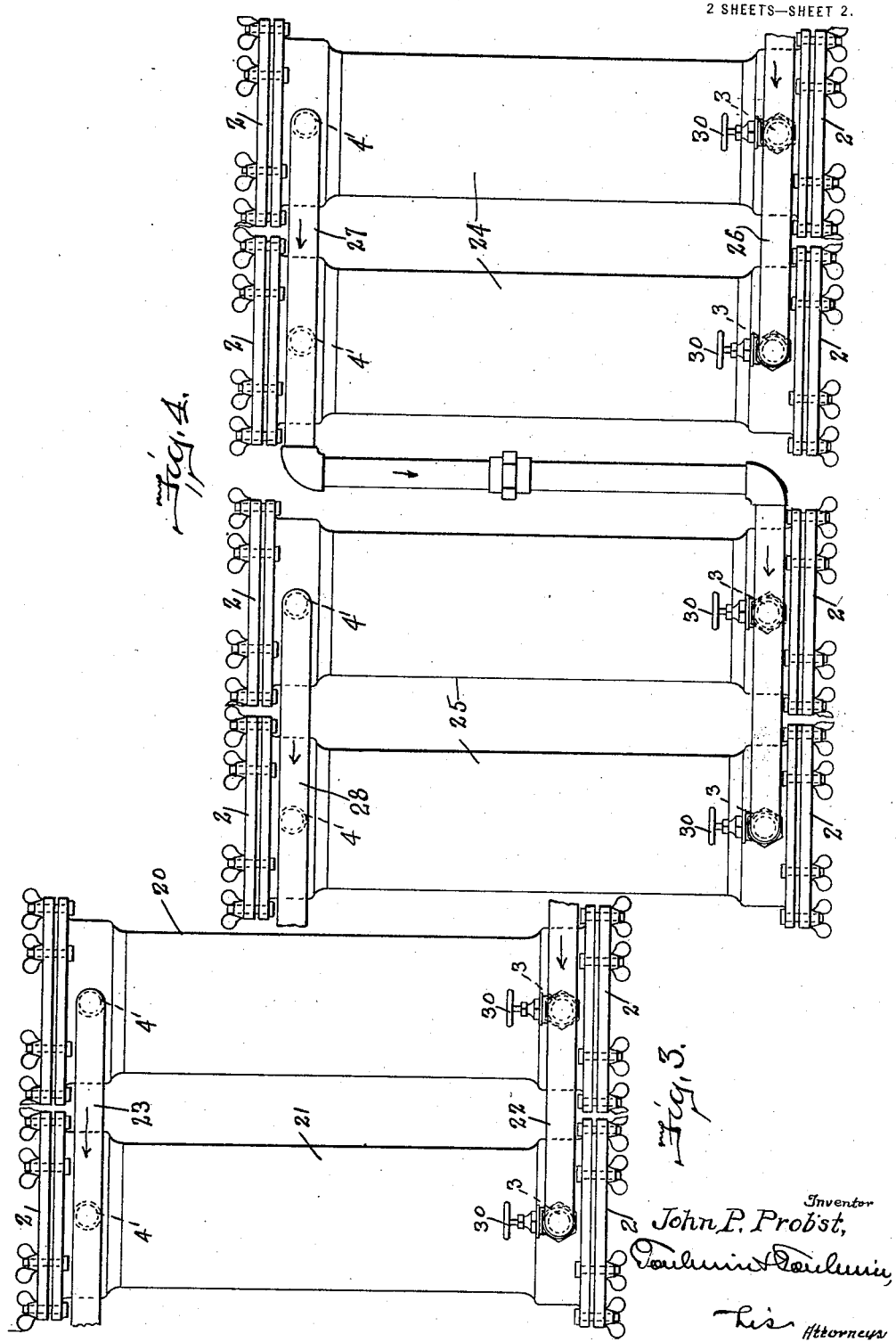

UNITED STATES PATENT OFFICE.

JOHN P. PROBST, OF MARION, OHIO.

PROCESS OF FILTERING.

1,378,274.  Specification of Letters Patent.  Patented May 17, 1921.

Application filed June 12, 1919. Serial No. 303,665.

*To all whom it may concern:*

Be it known that I, JOHN P. PROBST, a citizen of the United States, residing at Marion, in the county of Marion and State of Ohio, have invented certain new and useful Improvements in Processes of Filtering, of which the following is a specification, reference being had therein to the accompanying drawing.

This invention relates to an improved process of filtering and has for its particular object to provide filtering apparatus of any suitable character arranged in such a manner whereby the capacity of the apparatus may be determined by increasing or decreasing, respectively, the number of filter units; whereby primary and secondary filtering operation may be effected; whereby the filtering process may be simultaneously in progress in two or more filter units connected to common service supply and service distributing pipes; and whereby the filtering operations may be continuous through a series of single or multiple filtering units.

The purpose of my improved filtering process may be realized in any suitable filtering device. As here shown a preferred form of apparatus may be provided in filters of the general character shown in Patent No. 1,247,875, issued to me Nov. 27, 1917, and further illustrated in various improved forms in my copending applications for Letters Patent, Ser. No. 276,986, filed Feb. 14, 1919, and Ser. No. 283,028, filed March 17, 1919 and Ser. No. 303,666, filed June 12, 1919.

Commercial experience has taught that it is of great practicable advantage to manufacture the filters in a standard size to simplify and cheapen the manufacture thereof and to provide for using them in multiple form where an apparatus of increased capacity is required. Thus the apparatus is readily adaptable to all requirements merely by installing the number of filter units required for a given service capacity.

Experience has further taught that under certain conditions it is desirable to carry the filtering process through successive steps of filtration either in a single filter unit or in a plurality of units arranged in series. Thus in my improved process provision may be made, as illustrated in the accompanying drawings, to conduct the liquid through primary and secondary filtering operations which may be effected in a single filter unit by using suitable material through which the liquid is conducted in the initial step of filtration, whereby the coarser and greater portion of foreign substances is separated from the liquid and then causing the liquid to filter through additional material, which may be of different or finer quality, to remove any foreign substances remaining in the liquid after the initial operation.

It has also been found by experience that it aids materially in the filtering process to use an apparatus in which the flow of the liquid as it is received in the filter is disrupted and introduced to the filtering material in the form of spray or small streams admitted through perforations suitably arranged in the filter casing.

By thus disrupting the stream as it is delivered to the filter from the service supply pipe, even distribution of the liquid through the filtering material is obtained; the formation of pockets, in which stagnant pools of the liquid may be formed, or open channels in the filtering material, through which the liquid would flow without being filtered, being thus avoided.

While the apparatus here shown is a preferred form in which my improved filtering process may be practised, the process is not limited to any specific form of apparatus but may be practised with filters of any suitable construction whereby the essential features of the process may be realized.

In the accompanying drawings;

Figure 1 is a vertical cross sectional view of one form of single unit filter in which my improved process may be practised;

Fig. 2 is a side elevation of a two-unit filter arranged in series for successive filtration;

Fig. 3 is a side elevation of a two-unit filter arranged in series for simultaneous filtration; and Fig. 4 is a side elevation of a two-unit filter arranged in double series for successive filtration.

As here shown the filter unit may consist of any suitable casing 1, having suitable water-tight heads 2 secured to the open ends thereof, and provided with inlet and outlet ports 3 and 4, respectively, whereby the liquid may be delivered to and from the filter.

In the preferred form here shown the filter casing is provided externally, in any suitable manner, at the opposite ends thereof with annular inlet and outlet channels 5 and 6, respectively, which communicate with the filter chambers through perforated portions 8 and 9 of the filter casing. Thus the liquid introduced to the filter through the channel 5 is disrupted from the solid stream or flow as it is delivered from the service pipe and is admitted to the casing through the perforated wall 8 in the form of spray or fine streams which serves to evenly distribute the liquid to the filtering material. The perforated wall 9 and channel 6 at the opposite end of the casing act to prevent any of the liquid being delivered directly to the outlet port of the filter, the arrangement being for the purposes stated.

Also, as here shown in preferred form, the filter unit may consist of primary and secondary filtering chambers. The primary chamber 10, occupying the lower portion of the filter casing is preferably filled with compressed sponges, each layer of the sponges consisting of a single sponge compressed to fit within the casing and to form a layer of uniform density of the sponge material.

The secondary filtering chamber occupies the upper portion of the filter casing and consists, as here shown, of a supplemental casing 11 defining the filter chamber 12. The casing 11 may be supported within the main casing 1 in any suitable manner and is provided with an apertured top and bottom 13 and 14 which serve to confine within the casing 11 suitable material 15, consisting as here shown of compressed gauze, which serves to effect the second step of the filtering process as practised in a single unit filter.

As shown in Fig. 2 of the drawings successive filtration may be further practised under my improved process by arranging two or more filters in series. Under this arrangement, as well as in the arrangement shown in Figs. 3 and 4, filter units with or without the primary and secondary filtering chambers above described may be used. In the arrangement shown in Fig. 2 the apparatus is of single unit capacity, the unit 16 being adapted to receive liquid from the service pipe 17 and to deliver the same through a connecting pipe 18 to the unit 19, thus effecting double or successive filtration of the liquid.

As shown in Fig. 3 my process may be applied in a double-unit filter for simultaneous filtration, the two units 20 and 21 being connected by pipes 22 and 23, and as shown in Fig. 4, the process may be practised in a double-unit, double series apparatus for simultaneous and successive filtration and consisting of the double units 24—24 and 25—25, the service supply pipe 26, connecting pipe 27 and discharge pipe 28, the arrangement shown being for the purpose of illustration only, as it will be understood that the apparatus may consist of any number of filter units arranged in any suitable series for the purposes stated.

Where my improved process is practised with two or more filters arranged in series for simultaneous filtration, the liquid supply pipe of each filter is preferably provided with a valve 30 whereby each filter may be shut off without affecting the operation of the other, the arrangement being of advantage when the filters are cleaned after extended periods of use.

As far as I am aware I am the first to evolve a filtering apparatus and process practised therewith embodying the underlying principles and purposes of the present invention. I wish to claim the invention broadly therefore without reference to details of construction and arrangement as defined and comprehended in the appended claims.

Having thus fully described my invention, what I claim as new and desire to secure by Letters Patent, is:—

1. In the filtration of liquid, the herein described process consisting in causing the liquid delivered from a service pipe to be disrupted as it enters the filtering chamber by flowing through a perforated surface in the side wall of the casing in causing the liquid under pressure to filter through a plurality of integral layers of compressed sponges superimposed in the lower filter chamber to prevent currents of the liquid being formed therein and to effect primary filtration thereof, in causing the liquid to then filter through the material in an upper chamber arranged to prevent currents of the liquid therethrough and adapted to effect secondary filtration thereof and to cause said liquid to be a second time disrupted as it passes from said secondary filtration chamber by flowing over a perforated surface in the side wall of the casing.

2. In the filtration of liquid the herein described process consisting in delivering the liquid through a common service connection to two or more filter units in disrupted form as it enters the filter by causing it to flow through perforated surfaces in the side walls of said units, in causing the liquid under pressure to filter a plurality of integral layers of compressed sponges superimposed in the filter chambers, in preventing currents of liquid as it passes through said filters in effecting simultaneous primary secondary filtration thereof, in causing the liquid to pass through said filtrations through a common connection or two or more filter units arranged in series with first named units to effect in like manner simultaneous primary and secondary filtration thereof, and in causing the liquid to be delivered from the secondary units into common delivery connections.

3. In the filtration of liquid the herein described process consisting in delivering the liquid from a surface pipe in disrupted form as it enters two or more filter units, by causing it to flow through perforated surfaces in the side walls of said units, in causing the liquid under pressure to filter a plurality of integral layers of compressed sponges superimposed in the filter chambers in preventing currents of the liquid as it passes through said filters in effecting simultaneous primary and secondary filtration thereof, in causing the liquid to pass from said filters to two or more like filter units arranged in series with the first named units to effect in like manner simultaneous primary and secondary filtration thereof, and in causing the liquid to be delivered from the secondary units into delivery connections.

In testimony whereof, I affix my signature.

JOHN P. PROBST.